Patented Sept. 5, 1939

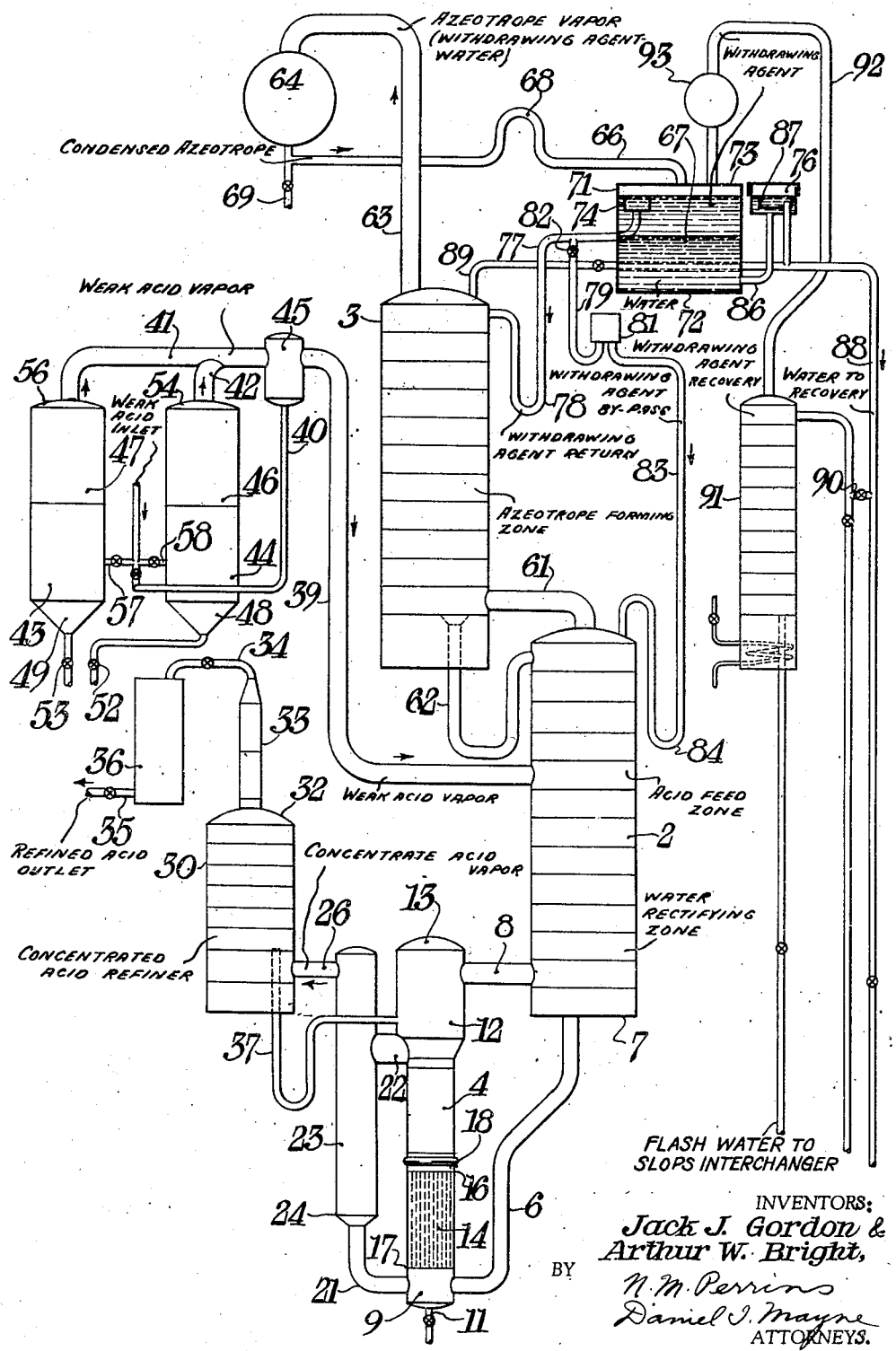

2,171,549

UNITED STATES PATENT OFFICE 2,171,549

PROCESS FOR AZEOTROPIC DISTILLATION OF ALIPHATIC ACIDS

Jack J. Gordon and Arthur W. Bright, Kingsport, Tenn., assignors, by mesne assignments, to Eastman Kodak Company, Jersey City, N. J., a corporation of New Jersey Application June 12, 1935, Serial No. 26,227

7 Claims. (Cl. 202—42)

This invention relates to improvements in processes of removing water from aqueous aliphatic acids and more particularly to an improvement process for the dehydration of dilute aqueous solutions of acetic or propionic acids by the use of aliphatic ester dehydrating agents.

The complete or partial dehydration of aqueous aliphatic acids is a problem of great technical importance. For example, certain processes, such as the manufacture of cellulose acetate or other cellulosic materials, require large quantities of concentrated or anhydrous acids, and after the processes are completed, there is generally left a great amount of dilute acid which must be dehydrated before the acid can be reutilized. There are various other sources of dilute acid, as for example, the acid liquid, together with various impurities, obtained by the destructive distillation of wood, which is called pyroligneous liquid. After separating out the impurities, the solution must be concentrated to recover the desired acids.

Likewise, when acids are produced by the action of micro-organisms, they are obtained in the dilute state and therefore must be concentrated in order to obtain the desired commercial product. It is, therefore, apparent that to lessen the expense of dehydration without the sacrifice of efficiency is a highly desirable result.

Various processes for the concentration or dehydration of aliphatic acids have been devised, among which the processes and apparatus in the copending applications to Gordon and Conklin, Serial Nos. 744,250 now Patent No. 2,049,440 and 744,251 represent some of the best commercially utilizable devices and methods available.

In general, before the developments of Gordon and Conklin, processes of the prior art included extracting dilute acids with agents such as ethyl acetate, ethyl butyrate or iso-propyl acetate, after which the extract is further treated with an alcohol for the purpose of producing more ester. The resulting mixture is finally distilled to vaporize off the ester and water as an azeotropic mixture. There are also known processes in which the dilute acid is converted to ester after which the concentrated acid is recovered from the ester. Such processes, however, are rather complicated.

We have developed a new apparatus for dehydrating dilute aliphatic acids with the acetate-alcohol withdrawing agents shown in Gordon and Conklin and other alcohol-containing agents, together with new continuous processes for utilizing these agents and apparatus.

This invention has as an object to provide a process of removing water from dilute solutions of acetic, propionic, and aqueous mixtures containing these acids. A further object is to provide a process which is applicable not only to relatively pure water solutions of acetic, propionic and other acids, but also to the production of dehydrated acid from crude aqueous solutions, such as pyroligneous liquor. Another object is to provide a process in which the water removed carries with it to waste only a very small amount of acid. A further object is to provide a process in which distillation is the main factor. It is also an object to provide a process which will be simple, inexpensive, and yet applicable to solutions of any strength.

Another object is to provide a process and apparatus employing withdrawing agents that remove more water per unit withdrawing agent than other agents which allow operable temperatures with aliphatic acids. Still another object is to provide a process in which the amount of heat required is kept to a low value. It is also an object to provide a process of concentrating aqueous aliphatic acids which is continuous. Another object is to provide a process in which the withdrawing agent is employed in such a manner that the finally dehydrated acid is not contaminated with the agent. A still further object is to apportion and circulate the dehydrating agent. Another object is to provide a process for the partial concentration of acetic, propionic or other fatty acids, or mixtures thereof, from their aqueous solutions. It is also an object to provide a process in which the same medium may be used both as an extracting agent and a water-withdrawing agent.

Another object is to provide apparatus containing a novel relationship between the feed and agent by-pass. A further object, and more particular object, is to provide a novel distillation unit including a plurality of columns to which the withdrawing agent may be supplied at a number of points. Another object is to provide a novel arrangement of feeding and heating means for the columns. Other objects will appear hereinafter.

These objects are accomplished by the following invention which comprises primarily a distillation process for removing water from aqueous aliphatic acids, but which in some instances may employ extraction steps. We have found that highly desirable results may be obtained in accordance with our general procedure by incorporating with the aqueous acid or acid mixture a dehydrating agent comprising an ester and alcohol entrainer, and distilling water and entrainer from the mixture to be dehydrated at a temperature below the boiling point of the acid or acids in question and also below the boiling point of water.

Examples of some of the withdrawing agents which may be employed are as follows:

n-Propyl acetate-n-propyl alcohol.
Iso-propyl acetate—iso-propyl alcohol.
n-Butyl acetate—n-butyl alcohol.
Iso-butyl acetate—iso-butyl alcohol.
Secondary butyl acetate—secondary butyl alcohol.
n-Amyl acetate—n-amyl alcohol.
Iso-amyl acetate—iso-amyl alcohol.
Secondary amyl acetate—secondary amyl alcohol.

Other related agents, such as propyl propionate-propyl alcohol may be employed. Certain of these novel alcohol containing agents and others are the invention of Gordon and Conklin, and are described and claimed in the above-mentioned copending applications Nos. 744,250 now Patent No. 2,049,440, 744,251 and other applications.

Our novel apparatus and process may also be employed with ethyl acetate-ethyl alcohol, but the higher acetate-alcohols are preferred.

It is important to note that practically all of these new entraining agents do not fall in the class of extremely low boiling-point compounds already known as ethyl acetates alone. Most of these preferred agents fall generally in a class of agents which boil above the low boiling point solvents and form minimum boiling mixtures with water.

Our apparatus layouts and processes represent special modifications and improvements in the broad invention taught and embraced by Gordon and Conklin.

We have discovered and developed the various features, including employing an aliphatic ester containing withdrawing agent, not only in the preferred two column apparatus and process herein described in detail to produce highly efficient and satisfactory dehydration results, but that superior results may be produced in other types of columns, such as a single vertical column provided the proper relationship between the feed and by-pass, in accordance with the present invention, is employed.

In the preferred embodiment of our process, the normal-propyl acetate-n-propyl alcohol or butyl acetate-butyl alcohol or other agent passes through a cycle without serious loss and can be re-used in a continuous manner. We have found that the alcohol-containing entrainers possess all the requisites of an organic agent for use, for example, in the dehydration of dilute acetic acid by azeotropic distillation and produce exceptionally good results for continuous operation when employed in accordance with the present invention.

One form of entrainer comprises, as a major constituent, normal-propyl acetate, which is a compound within the formula $CH_3COOC_3H_7$, a molecular weight of 102.1, density of .891, boiling point of approximately 102° C., and as a minor constituent, normal-propyl alcohol, sometimes referred to as ethyl carbinol or propanol. This other constituent is a colorless liquid having the following formula: $C_3H_7OH$, a density of .799 and a boiling point of approximately 98° C. Or n-butyl acetate ($CH_3COOC_4H_9$, B. P. 126° C.) in a major proportion with a smaller proportion of n-butyl alcohol ($C_4H_9OH$, B. P. about 118° C.) is a good dehydrating agent for use in the present process and apparatus.

Other compounds which do not detrimentally affect the agent in its use for dehydrating may, of course, be present in small amounts, and the invention is to be construed as embracing any such diluent materials and the use of th acetate-alcohol or other agent, either in the chemically pure or commercially obtainable condition. Further details concerning our preferred process and apparatus, and the use with alcohol-containing agents, may be observed from a consideration of the following:

Fig. 1 represents a diagrammatic side elevation of the preferred embodiment of a plant layout of our new distillation unit and associated apparatus for practicing our new process, certain parts being shown in section or broken away and other parts on an enlarged scale for clarity.

In Fig. 1, 2 represents the lower or primarily water distilling column of the unit. This column contains a plurality of bubble plate sections, usually between about 20 and 35 dependent on the capacity required and the efficiency of rectification desired.

Above, and in offset relationship to column 2, is another column designated 3, of construction similar to column 2. This column, when operating in accordance with one aspect of our process, can be considered primarily as an azeotrope fractionating column.

Most of the heat required for distillation is supplied to the system by means of the calandria section 4 connected to column 2 at the column bottom 7 by conduit 6 and to the column side by conduit 8. The acid in the liquid state flows down conduit 6 into the calandria base 9.

The calandria comprises the vertically extending cylinder 4 provided with the base 9 having the valved outlet 11, for withdrawing solid residue or other materials from the calandria. The upper portion of the calandria comprises the enlarged portion 12, provided with the cap 13 and connected to column 2 by conduit 8.

The interior of the calandria may be constructed in any suitable manner, whereby the acid liquid may be heated and vaporized. For example, a plurality of, or nests, tubes 14 arranged in any suitable boiler tube construction, such as between tube sheets 16 and 17, may be employed. The acid passes through the tubes which are surrounded by an appropriate heating medium. Usually several such sections are required and expansion means 18 may be placed between such sections.

Some of the acid liquid entering the base of the calandria is heated by passing through the several heating sections, finally vaporizing and expanding in the enlarged portion 12, whereupon it passes into column 2 through conduit 8. By virtue of heating the acid stream in this manner, a pinch effect is exerted on the liquid and a well-defined circulation down the pipe 6, up through the calandria and into the column 2 is established.

Part of the acid liquid and/or vapors, instead of circulating as just described, pass through conduits 21 and 22 into an adjacent parallel unit comprising the vertically extending cylindrical shell 23. The interior of the shell may be provided with heating means, such as for example as described with respect to calandria 4. This shell is connected at its bottom 24 with conduit 21 and at the upper part above conduit 22 with another pipe 26, which leads into the side of a small refining column designated 30.

This refining column 30 is of bubble plate construction, similar to the construction of columns 2 and 3, but on a smaller scale. The head 32 of this refining column is provided with the dephlegmator 33 which is connected by means of the valved pipe 34 with the condenser 36. In that the purified concentrated acid passes through this device, it is important that the condenser be constructed of exceptionally high grade materials, such as of the noble metals, high grade Cr-Ni steel or the like, or ceramics or glass. This condenser may be equipped with valved draw off conduits and the like 35 for removing the condensate therefrom.

A U-shaped conduit 37, which is in the nature of an overflow conduit, extends up into the lower section of the refining column and connects it with the side of calandria 4.

As will be apparent as the description proceeds, by these connections between calandria 4, unit 23 and the refining column 30 a portion of the fully concentrated, or partially concentrated, acid (dependent on the specific process being employed) is conveniently recovered in a high state of purity in the condenser 36.

Referring now to the upper half of the water distilling column 2, there is provided a large vapor feed line 39, which branches into a plurality of vapor lines, such as 41 and 42. These branch lines lead to the head of a plurality of weak acid vaporizers 43 and 44.

These vaporizers comprise the tall cylindrical shells 46, 47 having conically shaped bottoms 48, 49, equipped with valved outlets 52, 53. The heads 54, 56 of the vaporizers are connected with the branch lines 41, 42.

These evaporators may be heated in any well known manner, either externally or internally; we prefer to employ steam coils (not shown) within the evaporators. Supplying the weak acid to be concentrated in the vapor phase from a plurality of vaporizers, as shown, has a number of advantages in a large installation. For example, the heated acid provides a source of heat at its point of introduction into the column and within the column, thereby requiring less heat to be supplied in the calandria. This better distributes the heat throughout the distillation unit. Solid impurities are kept out of the distillation columns. Also, if one vaporizer is out of use, the equipment may still be operated.

The evaporators are equipped with inlets 57, 58, for feeding in the weak acid. The weak acid may be in the form of an aqueous solution as obtained from cellulose ester manufacture, for example containing about 20–35% acid and the balance water, or the weak acid evaporated in evaporators 46, 47 might be as extract comprising acid, water and withdrawing agent.

A further preventative of impurities getting into the distillation columns is obtained by the trap provided in the vapor feed line 39, as at 45. This trap is connected by drain line 40 to the lower portion of vaporizers 46, 47 or conduits leading thereto. As indicated in the drawing, the vapor feed enters column 2 in the upper half and preferably at a point about two-thirds of the way up the lower column. In this particular set-up and invention, we consider the relationship between the vapor feed and withdrawing agent by-pass to be of great importance and it is with these features that our invention is particularly concerned.

While we describe our invention with particular reference to the two column arrangement shown, because this represents our preferred embodiment and possesses a number of advantages, such as definition of two zones (i. e., water fractionating zone and azeotrope fractionating zone), more satisfactory construction mechanically, and other advantages, it is to be understood that the invention is not limited specifically thereto but embraces broader embodiments.

That is, our invention could be applied to a single vertical column, as for example a column comprising 30–60 plates. Or, instead of employing two columns, three or more might be employed. The process being operated to maintain the separate zones therein in accordance with the present disclosure.

Referring again to our preferred embodiment, column 2 is provided with the horizontally extending vapor outlet 61, through which the vapors fractionated in column 2 may be conducted to the next and upper column 3. The liquid flowing down column 3 is conducted by a U-shaped conduit 62 into a plate section in the lower column 2.

The upper column 3 is provided with a vapor outlet conduit 63 for conducting off the vapors fractionated in this azeotrope column. These vapors are condensed in condenser 64, after which the condensate is led through pipe 66 to the decanter 67. Pipe 66 is provided with the expansion loop 68 and the valved branch conduit 69. This branch conduit may be employed to withdraw or by-pass materials from the system.

The decanter 67 comprises a tank having the sidewalls 71, a bottom 72 and top 73, the condensate pipe 66 being connected to the top. The decanter assembly includes two over-flow basins, namely the inside overflow 74 and the outside overflow 76. The positioning of these overflows and associated parts will be governed by whether the withdrawing agent being employed is heavier or lighter than water. Assuming the apparatus set-up is to employ an agent with a density less than water, so that it will form the top layer in the decanter, then the arrangement of overflow is as shown in Fig. 1. That is, the inside overflow 74 is positioned in the upper part of decanter 67. To obtain easy and proper flow the overflow may be equipped with an elliptical-shaped mouth. The overflow is connected by means of conduit 77, having the trap 78, to column 3 at about the top plate.

Branching from conduit 77 is the pipe 79, which leads to the sight glass and meter 81. A valve is provided at 82 to assist in controlling the flow of withdrawing agent in this branched line. Another pipe 83 having a liquid trap 84 connects the sight glass and meter 81 with the lower column 2, preferably at the head of this column.

As the description proceeds, it will be apparent that the arrangement and functioning of this branch line 79, 81, 83 is of great importance in operating in accordance with the present invention with an acetate-alcohol containing withdrawing agent to obtain highly efficient results.

Referring again to decanter 67, it will be noted that the outside overflow 76 is positioned on about the same level as the inside overflow. In the instance under consideration, where the water layer is the lower one, the outside overflow basin is connected to the bottom of the decanter by pipe 86 through which, when the decanter is filled to the proper liquid level, the decanter liquid will cause the water layer to rise through conduit 86 into overflow basin 76. The interior of this basin contains a second, adjustable, shallow, overflow mouth 87, whereby the watery layer can be caused to flow smoothly out of the overflow 76 and through either conduit 88 or 89. The pipe 89, provides a means of refluxing water, if desired.

The conduit 88 may be connected by valved pipe 90 to the flash column 91 of substantially usual construction. The flash column is provided with a vapor outlet 92 and condenser 93, wherein the agent flashed over is condensed and returned to the decanter, conduit 77. Or some other point of return for the entrainer is satisfactory, as long as it is returned to the entrainer cycle. The heated water coming off the flash column and at other points in the system may be passed through a heat exchanger to recover the heat therefrom before discharge to the sewer.

Suitable thermometers and/or other temperature recording devices (not shown) will be connected into the system at various points.

Considering now the withdrawing agent.

There is a favoring of a water content by the agents, such as propyl acetate-alcohol, rich in alcohol. This is an important factor in controlling the amount of water relative to the amount of agent, in order to insure the presence of enough, and preferably slightly more than enough, water in the distilling column, to remove all of the agent as an azeotrope, if all or part of the weak acid is being fed in the form of extract, for example.

The use of the preferred type of agents, either the propyl or butyl agents, described above allows dehydration processes to be carried on at lower temperatures than are possible with any other group of solvents, except the prior art, low boiling class. In fact, the temperatures are practically only a little higher than those necessary with the low boiling solvents. However, this new class of agents of Gordon and Conklin is more easily handled than the low boiling solvents, on account of their lower evaporation rates. They present a much more favorable distribution ratio, when used to extract, than on any higher boiling point solvents.

It is possible to obtain a better agent by mixing two liquids, one of which is soluble in water but is distributed well to the solvent side in the equilibrium, water-A-solvent, where A represents the mutually soluble substance. In this way, the distribution ratio for a fourth component, an aliphatic acid, may be increased greatly. Also, the solvent composition may be so regulated as to control the water content of the final extract. These features are supported in detail in the copending applications already referred to.

As pointed out, we may feed into our apparatus, by vaporizing in vaporizers 46, 47, weak acid either in the form of an aqueous solution (i. e. acid-water) from cellulose ester manufacture or pyroligneous liquor or other source, or in the form of an extract (i. e. acid-water-agent) or a combination of these sources.

While we generally use a major proportion of either normal-propyl acetate or butyl acetate and a minor proportion of the corresponding alcohol as described, we do not wish to be limited to these exact values and agents, since they have been given by way of illustration only. We prefer to use for the best results in our apparatus normal-propyl alcohol, in the neighborhood of around 13-15%, and the balance substantially all normal-propyl acetate. In the case of butyl alcohol, about 20-45% would be employed, with the balance butyl acetate. Small amounts of water may be present in both instances.

The advantage of using the mixed entrainers of acetate and alcohol over a one-component agent is evident from the following comparison, relating to the distillation step of our process:

| Agent | Azeotrope composition | B. P. of azeotrope |
|---|---|---|
| Propylene chloride | 88% propylene chloride<br>12% water | 78° |
| n-Propyl acetate | 86% n-propyl acetate<br>14% water | 82.4° |
| n-Propyl acetate<br>n-Propyl alcohol | 59½% n-propyl acetate<br>19½% n-propyl alcohol<br>21% water | 82.2° |
| n-Butyl acetate<br>n-Butyl alcohol | 35.3% n-butyl acetate<br>27.4% n-butyl alcohol<br>37.3% water | 89.4° |
| Iso-butyl acetate<br>Iso-butyl alcohol | 46.5% iso-butyl acetate<br>23.1% iso-butyl alcohol<br>30.4% water | 87.4% |

The above data is approximate, but considered accurate within a reasonable range allowed for experimental error in measurements made in large apparatus.

It will be noted that, when properly employed as withdrawing agents, the acetate-alcohol mixtures carry over the largest amount of water. This is very important, since it may readily be seen that the amount of water taken over is much greater than that taken over by any of the agents heretofore known. Furthermore, this large amount of water is taken over at temperatures in the vicinity of that required by propyl acetate alone for example.

The composition, about 28% butyl alcohol and about 72% butyl acetate, for example, represents about an alcohol-acetate ratio which is satisfactory in the apparatus shown, it being preferred to keep about this alcohol content, although results superior to the prior art can be obtained by alcohol contents greater than 28%, but such procedure is not considered as giving results of the efficiency obtained in accordance with the present invention. In order to obtain optimum results it is, of course, important to maintain the best ratio for the particular apparatus, not only when the apparatus is initially charged with alcohol-acetate of the proper composition but throughout continuance of operation.

In high volume continuous commercial operations, operating on various sources of weak acid, such drastic conditions may cause the alcohol-acetate ratio to change. At no time, however, does the alcohol content disappear or become materially lower than as initially charged. The tendency appeared to be for the alcohol content to increase. For example, operating under heavy and varied commercial conditions without our invention, on one analysis, the acetate content showed 86.6% acetate and 10.57% alcohol. A number of days later the acetate content showed only 81%. By constructing the apparatus and proceeding in accordance with the present invention, we were able to keep the agent and process under substantially optimum conditions at all times.

Or, because of changed conditions, it may be desirable, in order to produce optimum conditions, to change the acetate-alcohol ratio.

When using a plant layout as shown in Fig. 1 including two fractionating columns, there is, from the practical standpoint, substantially no acid lost in the concentration of aqueous acetic acid solutions. Since our process, when carried out in this apparatus and with the technique of the present invention causes substantially no acid losses, the process may be employed to concentrate aqueous acetic acid from any strength to the anhydrous condition. By employing the longer fractionating columns described, the efficiency of the process can be still further increased.

We have discovered that in our novel and efficient apparatus, as well as other types of apparatus, the preferred ester-alcohol ratios can be approximately maintained at all times by means of by-passing through the sealed line 79, 83 a part of the agent separated in the decanters to the base column 2 at a plate section positioned above the point of vapor feed. It is a very important feature employing our apparatus, or other apparatus, that the separated withdrawing agent be by-passed to the lower column at a plate section positioned above the feed plate. Preferably, about 2-12 plates above the vapor feed is satisfactory. Of course, the exact plate chosen will be dependent on the specific agent being employed, the specific number of plates in the column, etc.

Our invention embraces the by-passing of a portion of a separated alcohol-containing agent of the type described to a point in the unit above the feed to the unit. More particularly, this point would be, under general conditions, whether in a single vertical column or other structure, about 2-12 plates above the feed nipple or nipples, or point of introduction of the vapor. In a two column arrangement, in accordance with our preferred embodiment as shown, the by-pass is to any plate above the feed up to and including the head plate of the column. The head plate being preferred in the set-up shown.

As already indicated above, the copending applications of Gordon and Conklin concerns the present invention to some extent, however, the present invention is an improvement thereover in respect to the relationship between the feed and by-pass and other features.

With respect to the prior art, such as U. S. Patent No. 1,836,096, No. 1,744,503 (Dup. French No. 211,454), No. 1,744,504 and French No. 622,680, for example, various arrangements are shown for returning materials to distillation columns. However, in no instance in this art has provision been made to by-pass the major part of the agent separated in the decanter or separator to one zone of the column and the remaining part to a lower zone, or has the use in this manner of an ester-alcohol dehydrating agent been described or contemplated.

The exact amount of decanted agent to by-pass is likewise governed by specific details, however, when employing an alcohol-containing agent of the type described generally, by-passing between 3-30% of the decanted entrainer will be satisfactory.

The amount by-passed can be controlled and observed by means of valve 82, sight glass and meter 81 and the size of pipes 79, 83.

The following example is an illustration of our preferred process, reference being made in particular to Fig. 1 for an understanding thereof. At the onset, it is to be understood that, in the following description of our process, the specific values, specific materials, specific column and the like, set forth therein, are merely for the purpose of illustration and not to be construed as limiting the invention.

The upper azeotrope column 3 is charged with a predetermined amount of entraining agent, as for example n-propyl acetate-n-propyl alcohol, or n-butyl acetate-n-butyl alcohol. If the column has previously been operated, this predetermined amount will have been determined in the prior operation and this known required number of hundreds of pounds of agent will be introduced into the entrainer system, generally through the decanter and periodically until the total amount of agent is in the system.

If the approximate quantity of solvent and other features concerning the column are not known, then the column can be placed in operation in accordance with the following procedure, varied to some extent dependent upon whether it is desired to produce a wet acid or a dry acid, the agent to be employed and other specific considerations.

While this procedure is to be applied in particular to columns of which no characteristics are known, it may be applied in instances to columns which have been previously operated and of which the withdrawing agent capacity is known. In accordance with one of our processes, a wet acid is produced (i. e., an acid containing several percents of water).

Producing a wet acid in the disclosed apparatus possesses a number of advantages. The weak acid fed to evaporators 46 and 47 being from a commercial source, such as cellulose acetate manufacture, may be somewhat variable. In some instances, the acid being concentrated may contain only 25% acid, in other instances, the acid content may exceed 30%. This acid is concentrated in the present set-up to in the neighborhood of 50-80% or higher, thereby producing a constant product, though not anhydrous. In accordance with the procedure of this invention, the production of this wet acid of substantially constant strength therefrom is fed to a carefully controlled distillation system of construction similar to the present, wherein the acid may be completely concentrated to produce pure uncontaminated anhydrous acid under carefully controlled conditions. As pointed out in the Gordon and Conklin copending applications, propyl and butyl acetate containing agents are very successful entrainers, provided they are not permitted to get into concentrated acid.

Assuming that propyl acetate-propyl alcohol is the agent to be employed and assuming a wet acid is desired, the following steps would be taken. The upper column 3 would be charged with the acetate-alcohol entraining agent in a predetermined amount. This could be done by partially or completely filling the decanter with entraining agent, with or without a previous addition of a shallow layer of water. This amount of entraining agent should be insufficient to balance the column when the usual run of dilute acid is to be fed at a predetermined rate.

The weak acid vaporized from the two evaporators 46 and 47, is conducted through pipe 39 into the lower column, these feed vapors being at a temperature of above 100° C. and below the boiling point of the aliphatic acid under treatment. If the weak acid supplied comprises merely an aqueous solution of acid and water, the acid and some of the water tend to go down in column 2 and some acid and a greater amount of water up the column. The vapors traveling upwardly in the column pass through conduit 61 into the upper column 3, permeating the entire system and out through outlet conduit 63 into the condenser 64 and finally through conduit 66 into the decanter. The condensate running into the decanter displaces a portion of the predetermined amount of entraining agent which has been charged into the decanter and causes it to flow out of the over-flow 74 into the return-pipe 77 and the by-pass 79. The entrainer in pipe 77 is returned to the upper column 3 and after a short interval this upper column becomes permeated with entraining agent.

In the lower column, the acid tends to go down the column and out of the base thereof through the conduit 6 into the calandria, where some of the acid and any water are vaporized and pass back into the water fractionating column 2 again. By this means, in the lower column 2, the water and some of the acid are fractionated from the remainder of the acid, so there is a continuous supply of a small amount of acid and increasingly large volumes of water vapors passing out of the conduit 61 into the upper column 3. In this upper column 3 and also just before they leave column 3, these acid water vapors contact the entrainer displaced from the decanter and ternary azeotrope compositions of water and entrainer are formed. Since the azeotrope boils materially lower than the acid and/or water, it becomes readily fractionated from the acid and/or water, passing into vaporous condition out through the outlet conduit 63 to the condenser and decanter. The acid and/or water flow downwardly in column 3 and thence through U-shaped pipe 62 into the lower column.

In order to provide the right and desired amount of entraining agent within the column, the water layer overflowing from the decanter into the over-flow basin 76 is examined and analyzed. Under the conditions that have been just described, probably a substantial content of acid will be found in this sweet water, because of the insufficient original addition of entraining agent to the system. This content of acid, which may be several percent in the sweet water, indicates that there should be more entrainer added to the system and several hundred pounds of additional entrainer are generally required to be added to the system in a commercial set-up.

On the other hand, since we desire to produce a wet acid, too much entrainer should not be added to the system in the upper distillation column. By observing the temperatures in various parts of the column and examining and analyzing the concentrated acid liquid flowing through the pipes 62 and 66, or at some other low point in the column bases, for a propyl acetate-alcohol content, it can be determined if too large an amount of acetate-alcohol has been added. That is, if the concentrated acid, for example in any portion of the calandria section or the vicinity thereof shows an acetate-alcohol content, this evidences that the column is flooded or has too much acetate-alcohol entrainer in the system.

Therefore, the above steps are carried out periodically, the sweet water being examined for acid and the acid in the vicinity of the calandria, or at some point preferably below the vapor feed, being examined for acetate-alcohol entrainer until the following conditions prevail. The acid content in the sweet water should be under 1% and preferably under 0.1%. The acid in the calandria section, when a wet acid is being produced, should be entirely free of any traces of acetate-alcohol entrainer and contain the desired water content. Generally when starting the process by filling the decanter with entrainer, which subsequently becomes displaced by the condensate coming over, it will be necessary to add additional entrainer to the system several times to bring about the desired conditions of a low acid content in the sweet water, care being taken that the quantity of ester-alcohol entrainer added in the entrainer system of the upper column 3 is not so great as to be found in the lower column 2 at points much below the vapor feed. As these additional entrainer additions are made, it will be noted that the temperature readings throughout column 3 and in the top of column 2 gradually decrease. These temperature readings to a skilled operator will also serve as a guide to the attainment of the desired ester-alcohol content of the system.

When the desired conditions of low acid in the sweet water and no entrainer in the calandria section have been obtained, or even during the procedure to attain these conditions, in order to assist in maintaining the optimum conditions, a portion of the acetate-alcohol is by-passed through the valved circuit 79, 81, 83 into column 2. The exact amount to by-pass, usually being somewhat between 5% and 30%, will be governed by a number of factors, such as the concentration of the weak acid being fed in through vapor feed line 39. In any event, the upper ester-alcohol layer in the decanter 67 is examined from time to time and, if the ester content of the entrainer appears to be diminishing, then the quantity of separated entrainer being by-passed through the pipe 79, 83 should be increased. On the other hand, if the acetate content is shown by analysis of the entrainer layer in the decanter to be increasing, then the amount of entrainer being by-passed should be reduced. In another manner, the water layer from the decanter may be examined for alcohol and ester content. If it appears that large amounts of entrainer are being lost in the water layer and being passed through the flash column for recovery, as observed by the amount of entrainer being returned from the flash column, this would be an indication that more decanted entrainer should be by-passed through the sealed line 79, 83. Since any change is gradual, by the above described control steps, it is possible to check undesirable tendencies and maintain the ester-alcohol entrainer under optimum conditions of operation by our invention. The above procedure is applicable to other types of columns and distillation set-up and, accordingly, embraced by our invention.

As the process proceeds continuously, the ester and alcohol with the amount of water necessary to form a ternary azeotrope are distilled from the top of the column, passing to the condenser and then into the decanter, where the distillate becomes separated into layers. The watery layer may flow to a solvent recovery system or reflux and the entrainer layer is returned to the columns.

As already indicated above, a part of the entrainer layer in its return passage may be by-passed.

The acid and water in column 2 are dropped to calandria 4 then part to supplemental unit 23 which may be supplied with heat by steam, or in any other suitable manner. From these units is distilled the wet acetic acid, which is fractionated in refining column 30 and finally condensed in condenser 36.

The resulting wet acid could be used as obtained, or it may be completely dehydrated in a number of different ways, among which may be mentioned the following. By azeotropically distilling the wet acid with about just the right amount of n-propyl acetate, iso-propyl acetate, or propylene chloride to remove the remaining water as an azeotrope, if anything keeping a very minute excess of water present. Or, the process of azeotropic distillation described in the copending application No. 744,250 now Patent No. 2,049,440 of J. J. Gordon, filed September 15, 1934, may be employed. These processes have been referred to as examples, other agents and processes suitable for concentrating wet acid to produce a pure product may be employed.

There are a number of advantages in operating with an excess water to produce a wet acid, as already described. As for example, in this manner, it is certain even when operating on a fluctuating supply and the process is being controlled by inexperienced operators, the dehydrating agent will not contaminate the resulting concentrated acid. Large scale operators obtain dilute acid of various strength from various sources. This acid can be concentrated to a more uniform product, which may be finally concentrated under controlled conditions. This provides a method in which expert control is required in removing only a small amount of water.

It may be stated at this point that it is also a feature of the present invention not only to produce a wet acid but to so control the process that a completely dehydrated acid which does not contain any of the entraining agent is produced. In general, this may be done in the following ways. In all instances, just about the right amount of agent is used. That is, there is employed after the start of the process, or at any other point or time in the process, just about enough agent of a suitable composition to remove nearly all the water as an azeotrope in the distillation step and leave an anhydrous acid free of agent.

Should the water become in excess and wet acid result, an additional amount of agent may be added to the upper column or the decanter to overcome this condition. On the other hand, if an excess of acetate-alcohol should build up in the system, sufficient water, as in the form of increased feed of dilute acid, may be added to produce the preferred conditions, or the aqueous acid feed may be stopped and water refluxed through pipe 88 until the desired balance system is obtained, or some ester-alcohol may be removed from the system. That there is an excess of agent in the system may be determined in several ways, for example ester-alcohol will appear in the concentrated acid that is tapped off. Also a temperature rise in the system will occur.

In producing anhydrous acid in one step, the process is maintained so that in the lower part of the unit, as in column 2, acid and water are being rectified, and no agent is present at plates materially below the feed zone. The upper part of the system, as in column 3, containing the bulk of the agent.

Assuming that the process is in operation with a n-propyl acetate-n-propyl alcohol, the functioning of the unit is as follows: Upon the top plate of column 3 there exists a ternary azeotrope of normal-propyl acetate-n-propyl alcohol-water, boiling at about 82° C. which may be readily fractionated from water—B. P. 100° C.—and acetic acid—B. P. 118° C. This constant boiling mixture is vaporized by the heat supplied to the column from the calandria and the vapor feed, and this vaporous mixture passes over through the pipe 63 into the condenser 64, where it is condensed into a liquid mixture which then passes through the pipe 66 into the decanter 67.

In this decanter the water, being the heavier of the liquids, settles to the bottom and passes off therefrom by means of pipe 86 leading to the overflow and preferably to recover some of the agent, to a solvent recovery system 91. The pipes 71, 77 return most of the normal-propyl acetate-n-propyl alcohol to the head of the column 3. The other portion (around 10-15%) of the n-propyl acetate-n-propyl alcohol is by-passed to a point in the lower column above the vapor feed.

The process being in continuous operation, it is usually unnecessary to add further amounts of n-propyl acetate-n-propyl alcohol to the system. Any additions that are made would be used only to make up for the small amount of entrainer which may be lost in the system from slight leakage or by being carried off in some manner, such as by mechanical occlusion.

In either the first described process for producing wet acid from column 2, or the second for producing anhydrous acid directly therefrom, it is important for smooth operation that the processes be operated with the assistance of the two vaporizers 46, 47. Vaporous weak acid is continuously introduced through the pipe 29 at a rate equivalent to the capacity of the column 2 for dehydrating the aqueous acid. The lower portion of the column 2 will then perform the function of fractionating water and acid. The more concentrated acid refluxes into the calandria, where a portion accumulating is vaporized off through the pipe 26 and conducted to the refining still 30 after which it is condensed.

If, instead of introducing the aqueous acid as described (i. e. acid-water), it is desired to employ extract (i. e. acid-water-agent), the extract from an extraction column or agitator system is fed into evaporators 46, 47, either alone or preferably with aqueous aliphatic acid, wherein the extract is evaporated and conducted into the lower column 2. Since in this instance a certain amount of the withdrawing agent is being supplied in the feed, after the column reaches the proper condition, namely, so that content of acid in the sweet water is low, etc., an amount of agent equivalent to the amount of agent being supplied in the feed would be withdrawn from the decanter and returned to the extractor. The amount of agent returned to the upper column and by-passed to the lower column would be dependent on the excess acid-water content of the feed over and above that taken care of by the agent in the feed.

When feeding both extract and dilute acid one feed heater evaporation may be employed for the extract and the second for the dilute acid. Or the extract and dilute acid in the liquid state may be blended and the resultant mixture fed into both feed heaters and vaporized.

From the foregoing description, it is apparent that, in our new processes, the apparatus and the proper distillation steps are related. By employing an agent with a suitable alcohol content and under the conditions described, the process may be caused to yield a wet acid or, if desired, anhydrous acid. By condensing and separating the agent vaporized over in the distillation step and conducting away all or part, a suitable agent for use in an extraction step is obtained.

In the foregoing description, we have directed the description to a large extent to the use of n-propyl acetate-n-propyl alcohol or n-butyl acetate-n-butyl alcohol, because we consider these agents very satisfactory.

In our investigation, we have also determined that the other ester-alcohol agents listed are satisfactory and are ones to which the processes and apparatus herein described may be applied. Generically then, the agent may be described as comprising principally an ester of an aliphatic acid with an aliphatic alcohol, and an aliphatic alcohol.

The propyl propionate-propyl alcohol mixture is of particular value in the dehydration of propionic acid. The butyl acetate-butyl alcohol agents such as iso-butyl acetate-iso butyl alcohol or secondary butyl acetate and alcohol combinations are very useful in concentrating aqueous acetic acid or aqueous mixtures strong in acetic acid.

In employing the other agents in the processes and apparatus which have been described above in detail with respect to n-propyl acetate-n-propyl alcohol and butyl acetate-butyl alcohol, of course, due regard will be had for any differences in characteristics in the agents. That is, for example, some ester-alcohol combinations yield ternary azeotrope with water which boils at temperatures higher than the boiling point of the azeotrope formed in the distillation step when n-propyl acetate-n-propyl alcohol or butyl acetate-butyl alcohol are the entrainers. It is, therefore, apparent, due regard must be had for such differences and the process modified accordingly.

From the foregoing, it will be apparent that our invention may be carried out in other forms of apparatus of which Fig. 1 is given for the purpose of illustration and as the preferred embodiment. While in Fig. 1 two columns have been shown, it is to be understood that, for other constructions, it may be desirable to construct such a column in three or more sections placed one above or alongside of the other or in staggered relation. Other forms of apparatus and methods of carrying out the invention may be employed without departing from the spirit and scope thereof.

It will also be understood that the customary precautions for preventing heat losses by suitable insulation will be observed. The parts which contact with the acids are made out of materials suitable for that purpose, such as copper or copper alloys, aluminum alloys, iron silicon alloys, and stainless steel, such as 18% Cr-8% Ni variety, for example. Parts that are subjected to heat will also be constructed of suitable heat-resisting materials. The process is preferably operated under about atmospheric pressure conditions, although it can be conducted with the system at pressures either above or below atmospheric. When we refer to boiling points and the like, we refer to this data as being obtained under normal atmospheric conditions. Suitable meters and thermometers are to be employed where necessary.

The above disclosure further shows that an ester-alcohol entrainer is highly efficient in the concentration of aliphatic acids, including acetic, propionic and others, over long periods in continuous operation when properly carried out. We have found that the process herein described is especially effective in the dehydration of aqueous acetic acid which may contain in some instances varying amounts of other acidic materials, as would be the case of pyroligneous liquor.

What we claim is:

1. The continuous process of concentrating aqueous aliphatic acid by distillation in a plurality of fractionating columns which comprises supplying vaporous aqueous acid feed to one column, fractionating acid and water vapors from the acid, contacting these acid and water vapors with a small amount of acetate and alcohol bypassed to the vicinity of the feed but above the feed and, obtaining chemical reaction between acid and at least part of said alcohol, whereby the acetate content is caused to increase, conducting the resultant vaporous mixture of acid, water and entrainer to a second column into contact with further and larger quantities of acetate and alcohol entrainer, vaporizing and fractionating a ternary azeotrope of acetate, alcohol and water from the second column, condensing the vapor, separating the condensate into a watery layer and an acetate and alcohol layer, employing the separated acetate and alcohol layer to supply the aforementioned smaller and larger acetate and alcohol additions.

2. A continuous process of concentrating aqueous acetic acid by distillation which comprises vaporizing the aqueous acetic acid and feeding the vapors to the distillation, fractionating water and acetic acid from acetic acid, contacting this fractionated acid and water with a small quantity of 5-7 carbon atom acetate and a 3-5 carbon atom alcohol entrainer in a contact zone near but above the aforementioned feed, removing the resultant vapors from the contact zone, contacting these vapors in a second contact zone with further and larger quantities of said acetate and alcohol entrainer, fractionating and vaporizing a ternary azeotrope of acetate, alcohol and water vapors from the second zone, condensing and decanting these vapors to obtain acetate and alcohol entrainer and employing this decanted entrainer for the aforementioned smaller and larger acetate and alcohol entrainer additions.

3. A continuous process of concentrating aqueous acetic acid by distillation which comprises vaporizing and feeding the aqueous acetic acid, fractionating water and acetic acid from the acetic acid, contacting this fractionated acid and water with a small quantity of propyl acetate and propyl alcohol entrainer in a zone near but above the feed, removing the resultant vapors from the contact zone, contacting these vapors in a second zone with further and larger quantities of propyl acetate and propyl alcohol entrainer, fractionating and vaporizing a ternary azeotrope of propyl acetate, propyl alcohol and water vapors from the second zone, condensing and separating these vapors to obtain propyl acetate and propyl alcohol entrainer and employing this separated entrainer for the aforementioned smaller and larger propyl acetate and propyl alcohol entrainer additions by returning the separated entrainer to the two zones aforementioned.

4. A continuous process for the dehydration of aqueous solutions containing a lower aliphatic acid, which comprises supplying the aqueous solutions to a distillation unit having plates in the lower part, at least partially dehydrating the solution by means of azeotropic distillation with a withdrawing agent of aliphatic ester having at least five carbon atoms and an esterifiable aliphatic alcohol having at least three carbon atoms and present in a certain definite ratio to the ester, withdrawing distillate, separating withdrawing agent therefrom, passing a portion of the withdrawing agent to the upper part of the unit, passing another portion of the withdrawing agent to a lower point in the unit within 2-12 plates of the plate where the aqueous solution is supplied, and increasing the quantity of the withdrawing agent passed to the lower point in the unit as the alcohol content of the withdrawing agent increases.

5. In the process for dehydrating aqueous solutions containing at least one lower aliphatic acid in a distillation unit by a method employing vaporous feed, azeotropic distillation with a multi-component alcoholized entraining agent having a content greater than 10% of an esterifiable alcohol, condensation of the distillate and separation of the alcoholized agent therefrom, the steps of altering the entrainer composition which comprises returning a major part of the decanted entrainer layer comprising alcoholized agent to the upper part of the distillation unit and bypassing another part of the decanted entrainer layer to the distillation unit at a lower part but above and in close proximity to the feed so that at least a part of said alcoholized agent reacts with said aliphatic acid, thereby altering the entrainer content.

6. In the process for concentrating aqueous aliphatic acid materials in the form of extract and aqueous acid, including a distillation treatment of these materials in upper and lower distillation columns with entraining agent comprised principally of a 5-7 carbon atom acetate mixed with a 3-5 carbon atom alcohol, condensation of the distillate and decantation of the acetate and alcohol layer therefrom, the steps of employing a part of the decanted acetate and alcohol layer to form further extract, feeding the extract to the lower column, and returning another part of the decanted acetate and alcohol layer to both the upper and lower columns, the portion returned to the lower column being returned in close proximity to the feed so that the alcohol reacts with dehydrated acid, thereby altering the entrainer content.

7. A process for dehydrating aqueous solutions containing at least one lower aliphatic acid by means of azeotropic distillation with a multicomponent entrainer having as an essential ingredient a content of an esterifiable alcohol greater than 3%, which comprises feeding said aqueous solution to a distillation unit at the lower part thereof, distilling an azeotropic composition from the upper part of the unit and obtaining dehydrated acid in the lower half of the unit, separating the azeotropic composition into a water layer and entrainer layer containing said esterifiable alcohol, returning a portion of the separated layer to the upper portion of the unit for reflux and returning another portion of the separated layer to the lower half of the unit so that the alcohol ingredient may chemically react with dehydrated acid and the composition of the multicomponent entrainer become altered.

JACK J. GORDON.
ARTHUR W. BRIGHT.